US012204297B2

(12) United States Patent
Sohmshetty et al.

(10) Patent No.: US 12,204,297 B2
(45) Date of Patent: Jan. 21, 2025

(54) SYSTEMS AND METHODS FOR DETERMINING PREFERRED BATTERY CAPACITIES

(71) Applicant: Ford Global Technologies, LLC, Dearborn, MI (US)

(72) Inventors: Raj Sohmshetty, Canton, MI (US); Vikas Rajendra, Novi, MI (US); Sam Hoff, Hazel Park, MI (US); James Berg, Dearborn, MI (US); Alan Beltran, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 400 days.

(21) Appl. No.: 17/652,421

(22) Filed: Feb. 24, 2022

(65) Prior Publication Data
US 2023/0266723 A1    Aug. 24, 2023

(51) Int. Cl.
*G05B 13/04* (2006.01)
*B60L 3/12* (2006.01)
(Continued)

(52) U.S. Cl.
CPC .............. *G05B 13/042* (2013.01); *B60L 3/12* (2013.01); *B60L 53/64* (2019.02); *B60L 53/80* (2019.02); *H04W 4/029* (2018.02)

(58) Field of Classification Search
None
See application file for complete search history.

(56) References Cited

U.S. PATENT DOCUMENTS

| 2013/0030581 A1* | 1/2013 | Luke | B60L 7/06 705/14.1 |
| 2014/0266006 A1* | 9/2014 | Luke | B60L 53/80 320/106 |

(Continued)

FOREIGN PATENT DOCUMENTS

| CN | 112248876 A | 1/2021 |
| KR | 20170102255 A | 9/2017 |

OTHER PUBLICATIONS

Lin, "Optimized allocation of scooter battery swapping station under demand uncertainty", Apr. 2021, Sustainable Cities and Society 71 (2021) 102963, pp. 1-9 (Year: 2021).*

(Continued)

*Primary Examiner* — David Earl Ogg
(74) *Attorney, Agent, or Firm* — Emily Drake; Eversheds Sutherland (US) LLP

(57) ABSTRACT

The disclosure generally pertains to systems and methods for determining preferred battery capacities. In an example method, a first set of data associated with scooter usage in a geographic area may be received. A first number of battery packs and a second number of battery packs for servicing the geographic area may be determined based at least on the first set of data, where the first number of battery packs has a first power capacity and the second number of battery packs has a second power capacity. A first cost associated with the first number of battery packs and a second cost associated with the second number of battery packs may be determined via a simulation model. The first cost may be determined to be lower than the second cost, and the first number of battery packs having the first power capacity may be selected to service the geographic area.

5 Claims, 4 Drawing Sheets

(51) Int. Cl.
  *B60L 53/64*  (2019.01)
  *B60L 53/80*  (2019.01)
  *H04W 4/029*  (2018.01)

(56) References Cited

U.S. PATENT DOCUMENTS

| | | |
|---|---|---|
| 2019/0263281 A1 | 8/2019 | Wang |
| 2020/0185929 A1* | 6/2020 | Cooper ............... G06Q 10/06 |
| 2020/0313249 A1 | 10/2020 | Zhao |
| 2021/0380013 A1* | 12/2021 | Moszynski ............ B60L 53/66 |

OTHER PUBLICATIONS

Sarker, Mushfiqur et al., Electric Vehicle Battery Swapping Station: Business Case and Optimization Model, International Conference on Connected Vechicles and Expo (CCVE), DOI 10.1109, 2013.18, 289-294.

* cited by examiner

SYSTEMS AND METHODS FOR DETERMINING PREFERRED BATTERY CAPACITIES

BACKGROUND

Some scooters may be configured to be powered by swappable batteries. Swappable batteries may take the form of a single swappable battery pack or multiple stackable swappable battery packs. In some instances, scooter batteries may not be used to the maximum extent possible before being re-charged or swapped, which may be economically inefficient.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
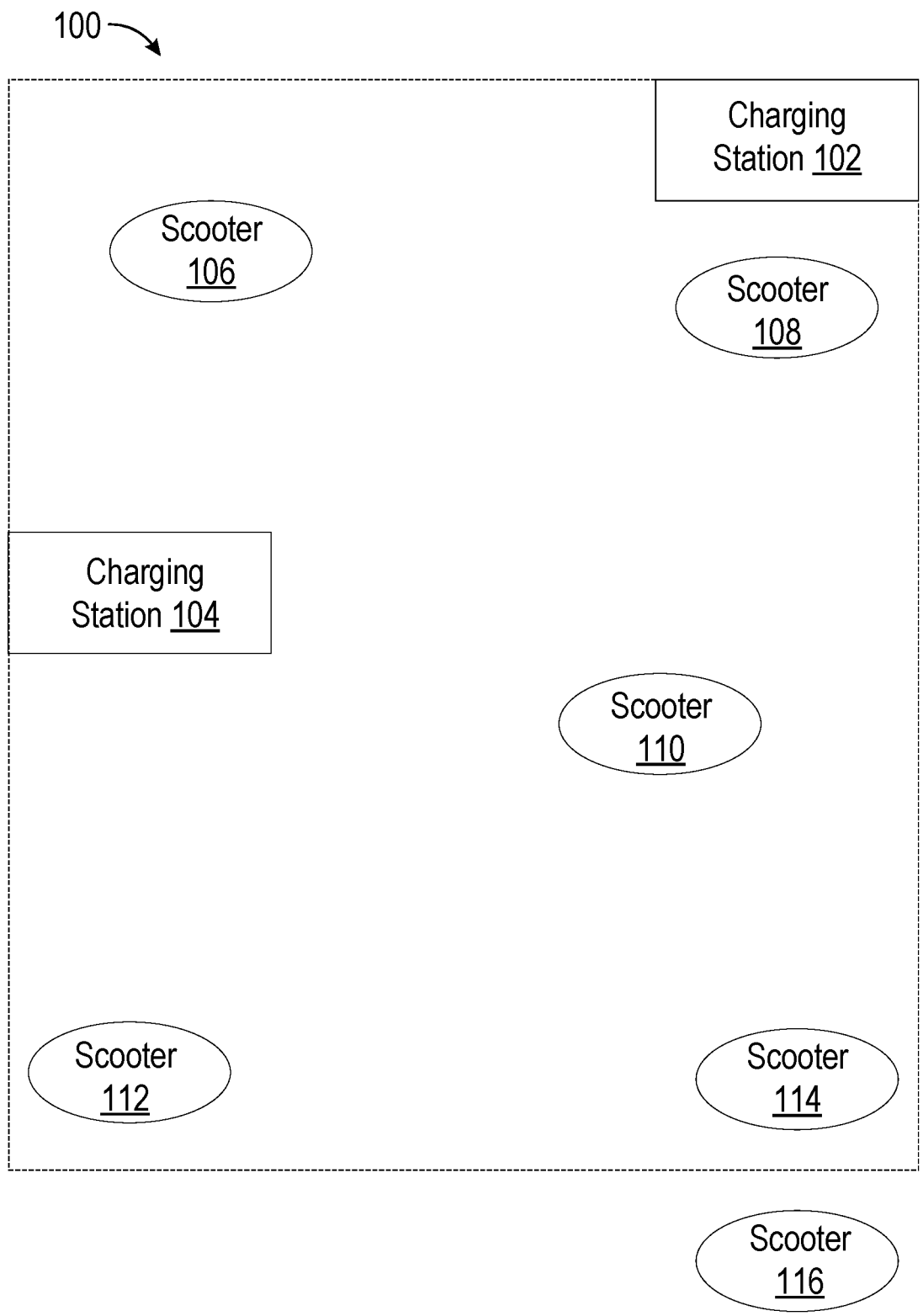
FIG. 1 illustrates an example implementation of a preferred battery capacity determination system in accordance with an embodiment of the disclosure.

In terms of a general overview, certain embodiments described in this disclosure are directed to systems and methods for determining preferred battery capacities. In an example method, a first set of data associated with scooter usage in a geographic area may be received. A first number of battery packs for servicing the geographic area may be determined based at least in part on the first set of data. The first number of battery packs may have a first power capacity. A second number of battery packs for servicing the geographic area may be determined based at least in part on the first set of data. The second number of battery packs has a second power capacity. A first cost associated with the first number of battery packs may be determined via a simulation model. A second cost associated with the second number of battery packs may also be determined via the simulation model. The first cost may be determined to be lower than the second cost, and the first number of battery packs having the first power capacity may be selected to service the geographic area.

Illustrative Embodiments

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionality described with respect to a particular device or component may be performed by another device or component.

Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and phrases are used herein solely for convenience and such words and terms should be interpreted as referring to various objects and actions that are generally understood in various forms and equivalencies by persons of ordinary skill in the art. The word "device" may be any of various devices, such as, for example, a user device such as a smartphone or a tablet, a smart vehicle, and a computer. The word "sensor" may be any of various sensors that can be found in a scooter, such as cameras, radar sensors, Lidar sensors, and sound sensors.

It must also be understood that words such as "implementation," "scenario," "case," and "situation" as used herein are an abbreviated version of the phrase "in an example ("implementation," "scenario," "case," "approach," and "situation") in accordance with the disclosure." Furthermore, the word "example" as used herein is intended to be non-exclusionary and non-limiting in nature.

FIG. 1 illustrates an example implementation of a preferred battery capacity determination system 100 in accordance with an embodiment of the disclosure. As depicted in FIG. 1, a geographic area may be identified. The geographic area may include at least one charging station, for example, charging stations 102 and 104, and at least one scooter for servicing the geographic area, for example, scooters 106, 108, 110, 112, and 114. In some embodiments, scooters that are not used to service the geographic area, for example, scooter 116, may be excluded from consideration when assessing a preferred battery capacity for the geographic area, which encompasses the charging stations 102 and 104 and the scooters 106, 108, 110, 112, and 114.

In some embodiments, the scooters 106, 108, 110, 112, and 114 may use battery packs to power operation of the scooters 106, 108, 110, 112, and 114. In some embodiments, the scooters 106, 108, 110, 112, and 114 may be powered by a single battery pack. In other embodiments, the scooters 106, 108, 110, 112, and 114 may be powered by multiple individual swappable battery packs. In some embodiments, the scooters 106, 108, 110, 112, and 114 may be powered by multiple individual swappable battery packs that may be stackable and/or connected in parallel. In some embodiments, the scooters 106, 108, 110, 112, and 114 may be configured such that the total capacity of the multiple individual swappable battery packs may be equivalent to the capacity of a single battery pack that is capable of powering each scooter 106, 108, 110, 112, and 114.

In some embodiments, battery packs in the scooters 106, 108, 110, 112, and 114 may be charged or swapped more than once a day. Swapping battery packs multiple times a day may be made possible by charging stations, such as charging stations 102 and 104, being increasingly available in each geographic area.

Figure 2:
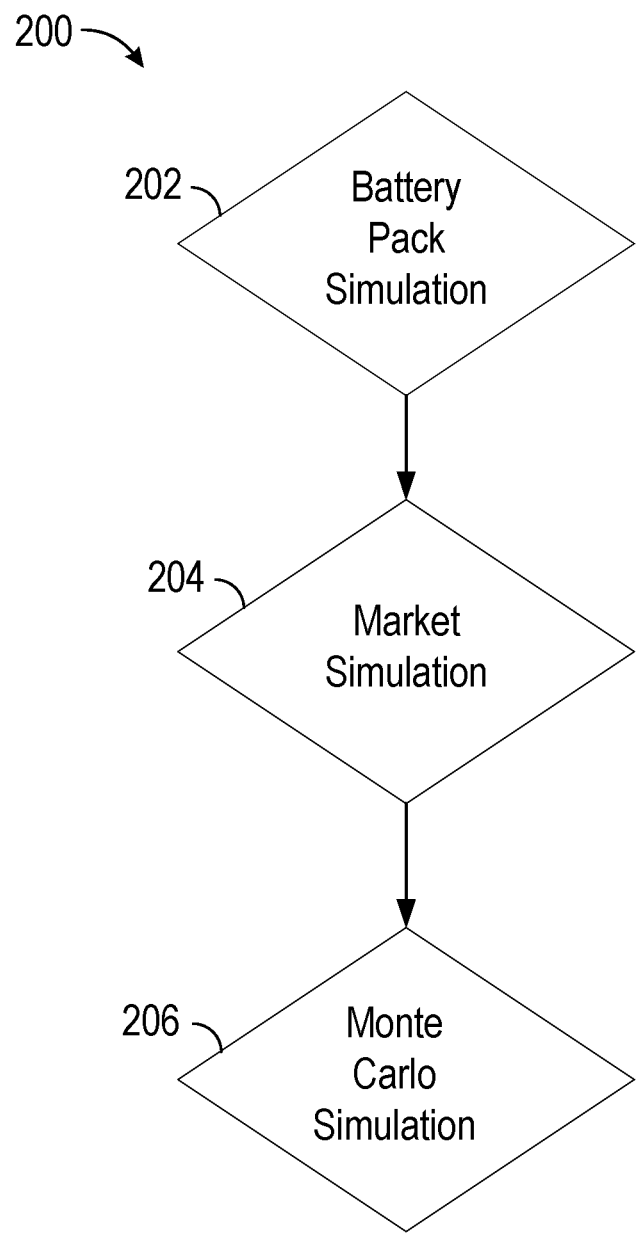
FIG. 2 illustrates an example implementation of a preferred battery capacity determination system in accordance with an embodiment of the disclosure.

FIG. 2 illustrates an example implementation of a preferred battery capacity determination system 200 in accordance with an embodiment of the disclosure. The preferred battery capacity determination system 200 may involve a model for predicting the preferred battery capacity used in swappable battery packs used to service scooters in a particular geographic area.

In some embodiments, the model may be developed based on a variety of inputs. For example, the model may be developed based at least in part on a predicted travel range for a swappable battery pack, a predicted travel time for a swappable battery pack, a predicted cost of a swappable battery pack, and/or other data associated with the swappable battery packs. The data associated with the swappable battery packs may include historical data associated with the swappable battery pack and/or predictive estimates of the data associated with the swappable battery packs. As another example, the model may be developed based at least in part on a number of geographic areas that are serviced by scooters. In another example, the model may be developed based at least in part on an estimated number of scooters in each geographic area.

In some examples, the model may involve the randomization of a number of trips associated with each scooter in each geographic area per day, a distance traveled by each scooter in each geographic area per day, and/or a battery depletion state of each scooter in each geographic area per day. In some examples, the model may consider swappable battery packs having a variety of battery capacities in a variety of stackable combinations. For example, a swappable battery pack may be one 600 Wh swappable battery pack, two 300 Wh swappable battery packs, or four 150 Wh swappable battery packs. Swappable battery packs having other battery capacities may also be considered by the model. In other examples, a number of swaps associated with swappable battery packs in each scooter in each geographic area may be considered by the model. For example, the model may consider a situation where swappable battery packs at each scooter may need to be swapped once a day, twice a day, or more than twice a day. In some examples, because the swappable battery packs may be configured to be stackable, the total battery capacity at each scooter may be customizable based on the number of swappable battery packs at the each scooter and the battery capacity of each swappable battery pack at the each scooter.

In some embodiments, the model may first include a battery pack simulation 202. The battery pack simulation 202 may determine a geographic area to be serviced. Based on the geographic area to be serviced, the battery pack simulation 202 may further determine a number of scooters used in the geographic area. In some embodiments, the battery pack simulation 202 may use sets of data associated with scooter usage in the geographic area. For example, the sets of data may include a number of scooters used in the geographic area, a number of trips made by each scooter in the geographic area, and/or a battery depletion state of each scooter in the geographic area. In some embodiments, the battery pack simulation 202 may use a randomized variable to represent a predictive number of trips taken by each scooter in the geographic area in each day and a predictive total distance traveled by each scooter in the geographic area in each day. In some embodiments, the battery pack simulation 202 may thus be based on the scooters in each geographic area, and battery pack simulation 202 may be used to determine an average battery pack consumption to service the scooters in each geographic area in a day.

In some embodiments, the model may next include a market simulation 204. The market simulation 204 may involve the battery pack simulation 202 being repeated for various geographic areas in order to determine an average battery pack consumption to service all scooters across the various geographic areas in each day. In some embodiments, the average number of battery packs required to service all scooters across the various geographic areas per day and a corresponding standard deviation may be determined.

In some embodiments, the model may finally include a Monte Carlo simulation 206 to determine a preferred battery pack capacity to service the scooters in each geographic area. Generally, the Monte Carlo simulation 206 may utilize mathematical techniques for estimating the possible outcomes of an uncertain event. The Monte Carlo simulation 206 may predict a set of outcomes based at least in part on an estimated range of values as opposed to a set of fixed input values. In some embodiments, the Monte Carlo simulation 206 may build a model of possible outputs by leveraging a probability distribution, for example, a uniform or normal distribution, for any variable having inherent uncertainty. In some embodiments, the Monte Carlo simulation 206 may utilize a randomized number of scooter trips associated with each scooter in the geographic area, a randomized distance traveled by each scooter in the geographic area, and/or a randomized battery depletion state of each scooter in the geographic area. The Monte Carlo simulation 206 may then recalculate the possible outputs repetitively using a different set of random numbers between a predetermined minimum value and a predetermined maximum value.

In some embodiments, the Monte Carlo simulation 206 may utilize the average number of battery packs required to service all scooters across all geographic areas and the corresponding standard deviation to perform the simulation. The Monte Carlo simulation 206 may further utilize randomization functions and/or functions for providing a Z value for cumulative probabilities using a standard normal distribution. The Monte Carlo simulation 206 may further be performed based on a desired number of battery pack swaps in a day and/or a desired battery capacity for the swappable battery packs. In some embodiments, multiple simulations are performed, where each simulation may calculate an average number of swappable battery packs to service scooters across all geographic areas. A mean number of swappable battery packs to service scooters across all geographic areas may then be averaged across the multiple simulations, and corresponding costs may be estimated based on the mean number of swappable battery packs to service the scooters across all geographic areas.

In some embodiments, the Monte Carlo simulation 206 may identify a potential first number of battery packs, each having a first power capacity, for servicing the geographic area based at least in part on the sets of data associated with scooter usage in each geographic area. The Monte Carlo simulation 206 may additionally identify a potential second number of battery packs, each having a second power capacity, for servicing the geographic area based at least in part on the sets of data associated with scooter usage in each geographic area. In some embodiments, the Monte Carlo simulation may estimate costs associated with the first number of battery packs and costs associated with the second number of battery packs. In some embodiments, the Monte Carlo simulation 206 may compare more than two numbers of battery packs having various power capacities. The Monte Carlo simulation 206 may additionally identify a recommended battery capacity for the swappable battery packs and a recommended number of swaps of swappable battery packs for scooters in each day. In some embodiments, the recommended battery capacity for the swappable battery packs may be identified based at least in part on a cost associated with the recommended battery capacity being lower than other estimated costs associated with other battery capacities. For example, the Monte Carlo simulation 206 may determine that the use of a first number of swappable battery packs having a first battery capacity may be preferable because of reduced costs as compared to a second number of swappable battery packs having a second battery capacity, while the second number of swappable battery packs is not significantly different the first number of swappable battery packs. In some embodiments, a first subset of the battery packs having the recommended battery capacity may be stacked at a charging station within the geographic area, while another subset of the battery packs having the recommended battery capacity may be stacked at another charging station within the geographic area.

Figure 3:
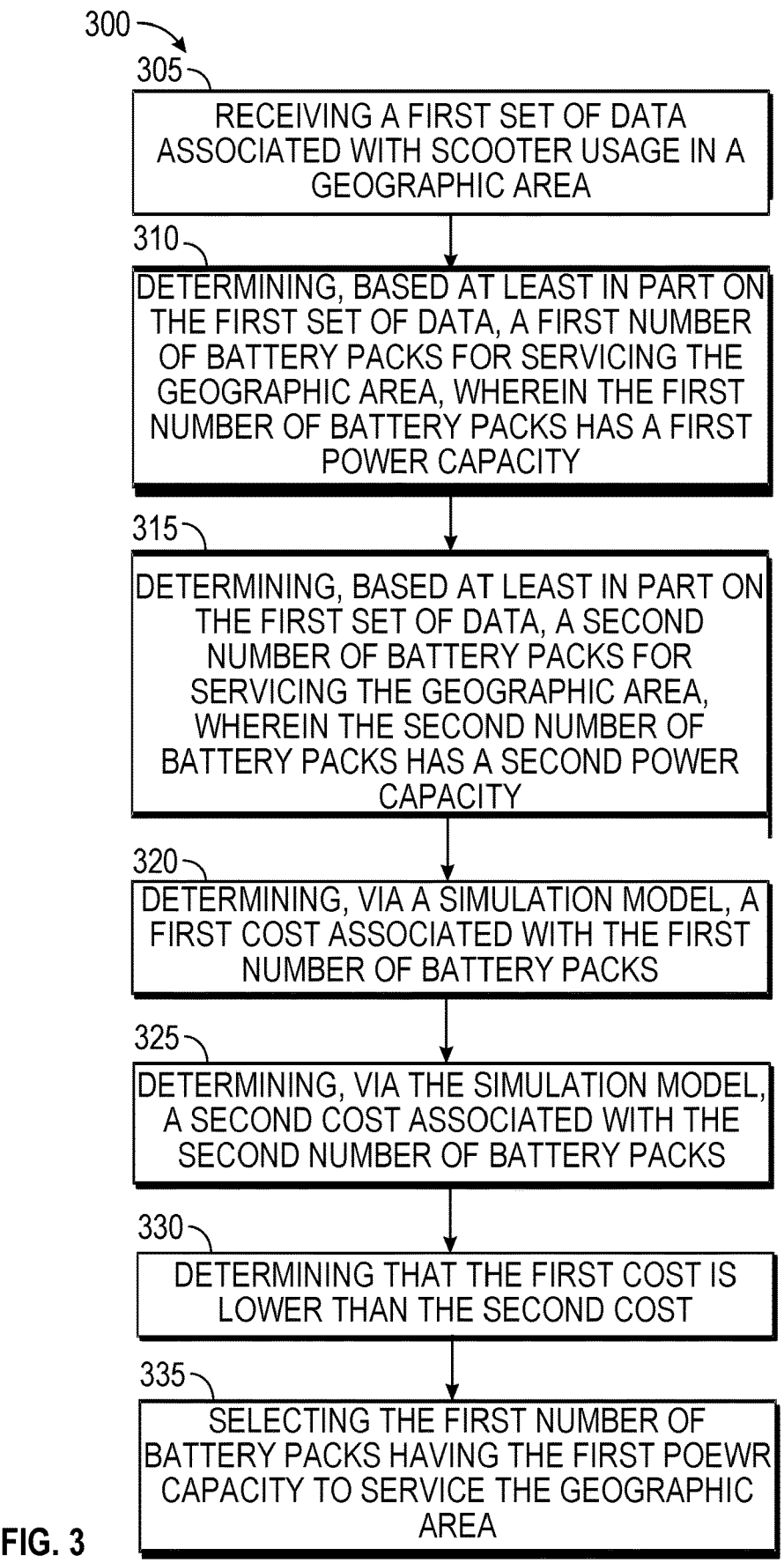
FIG. 3 depicts a flow chart of an example method for determining preferred battery capacities in accordance with the disclosure.

FIG. 3 shows a flow chart 300 of an example method of determining preferred battery capacities in accordance with the disclosure. The flow chart 300 illustrates a sequence of operations that can be implemented in hardware, software, or a combination thereof. In the context of software, the operations represent computer-executable instructions stored on one or more non-transitory computer-readable media such as a memory provided in a scooter computer, that, when executed by one or more processors such as the processor provided in the scooter computer, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be carried out in a different order, omitted, combined in any order, and/or carried out in parallel. Some or all of the operations described in the flow chart 300 may be carried out by the scooter computer either independently or in cooperation with other devices such as, for example, other components of the scooter (such as the scooters 106, 108, 110, 112, and 114 in FIG. 1) and cloud elements (such as, for example, a computer or cloud storage).

At block 305, a first set of data associated with scooter usage in a geographic area may be received. In some embodiments, the first set of data may include a number of scooters used in the geographic area, a number of scooter trips made in the geographic area, a distance travelled by each scooter in the geographic area, and a battery depletion state of the each scooter in the geographic area.

At block 310, a first number of battery packs for servicing the geographic area may be determined based at least in part on the first set of data. The first number of battery packs may have a first power capacity.

At block 315, a second number of battery packs for servicing the geographic area may be determined based at least in part on the first set of data. The second number of battery packs may have a second power capacity.

At block 320, a first cost associated with the first number of battery packs may be determined via a simulation model. In some embodiments, the simulation model may comprise Monte Carlo simulation. In some embodiments, the Monte Carlo simulation may involve randomizing a number of scooter trips associated with each scooter in the geographic area, a distance traveled by the each scooter in the geographic area, or a battery depletion state of the each scooter in the geographic area.

At block 325, a second cost associated with the second number of battery packs may be determined via the simulation model.

At block 330, the first cost may be determined to be lower than the second cost.

At block 335, the first number of battery packs having the first power capacity may be selected to service the geographic area. In some embodiments, a subset of the first number of battery packs to be used for a scooter may be determined. In some embodiments, a first subset of the first number of battery packs may be stacked at a first charging station in the geographic area, and a second subset of the first number of battery packs may be stacked at a second charging station in the geographic area.

In some embodiments, a third number of battery packs for servicing the geographic area may be determined based at least in part on the first set of data. The third number of battery packs may have a third power capacity. In some embodiments, a third cost associated with the third number of battery packs may be determined via the simulation model. In some embodiments, the third cost may be determined to be lower than the first cost, and the third number of battery packs having the third power capacity may be selected to service the geographic area.

Figure 4:
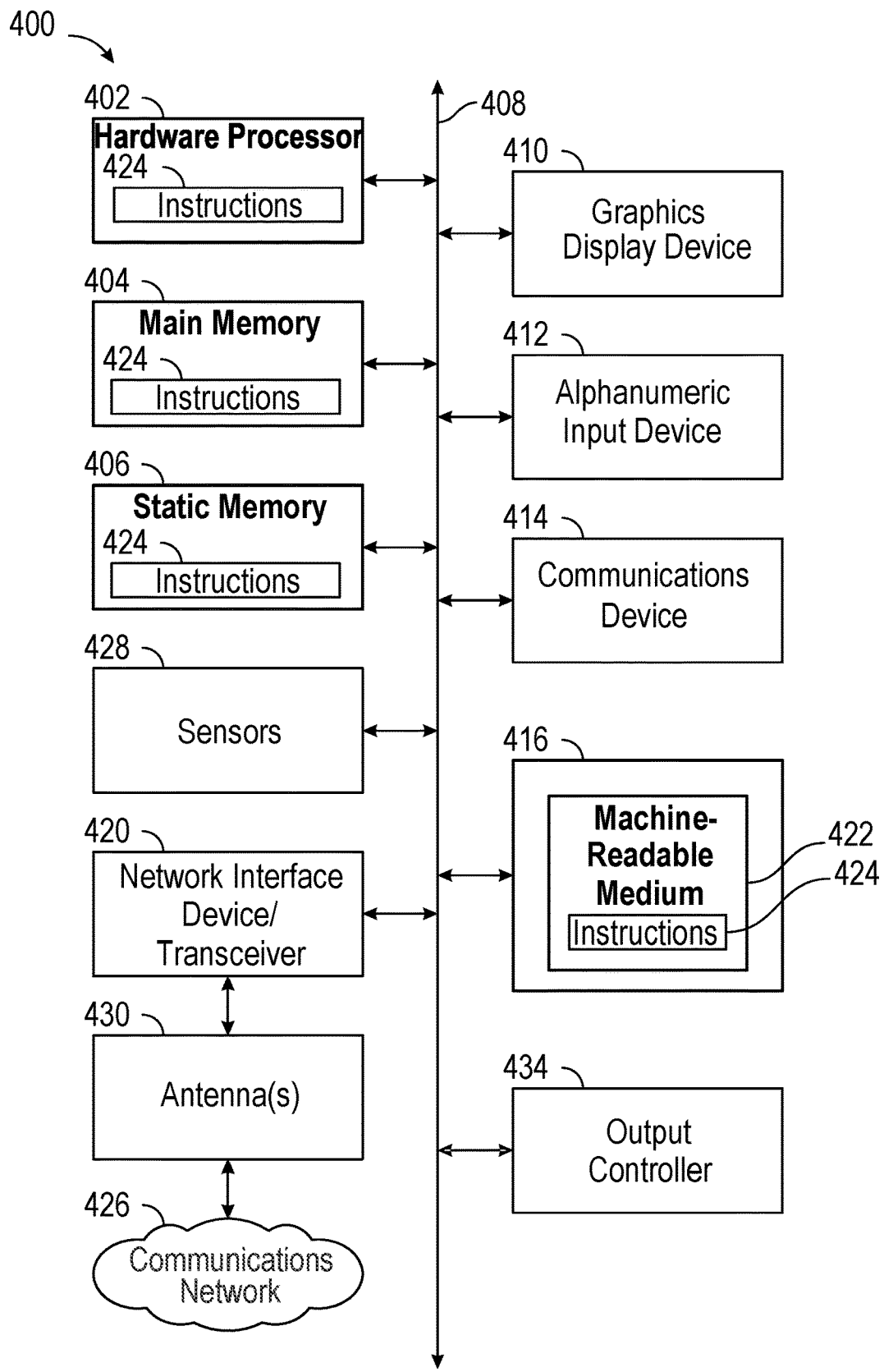
FIG. 4 depicts a block diagram of an example machine upon which any of one or more techniques (e.g., methods) may be performed, in accordance with an embodiment of the disclosure.

FIG. 4 depicts a block diagram of an example machine 400 upon which any of one or more techniques (e.g., methods) may be performed, in accordance with one or more example embodiments of the present disclosure. In other embodiments, the machine 400 may operate as a standalone device or may be connected (e.g., networked) to other machines. In a networked deployment, the machine 400 may operate in the capacity of a server machine, a client machine, or both in server-client network environments. In an example, the machine 400 may act as a peer machine in peer-to-peer (P2P) (or other distributed) network environments. The machine 400 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the execution units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 400 may include a hardware processor 402 (e.g., a central processing unit (CPU), a graphics processing unit (GPU), a hardware processor core, or any combination thereof), a main memory 404 and a static memory 406, some or all of which may communicate with each other via an interlink (e.g., bus) 408. The machine 400 may further include a graphics display device 410, an alphanumeric input device 412 (e.g., a keyboard), and a communications device 414. In an example, the graphics display device 410, the alphanumeric input device 412, and the communications device 414 may be a touch screen display. The machine 400 may additionally include a storage device (i.e., drive unit) 416, a network interface device/transceiver 420 coupled to antenna(s) 430, and one or more sensors 428, such as a global positioning system (GPS) sensor, a compass, an accelerometer, or other sensor. The machine 400 may include an output controller 434, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 416 may include a machine readable medium 422 on which is stored one or more sets of data structures or instructions 424 (e.g., software) embodying or utilized by any one or more of the techniques or functions described herein. The instructions 424 may also reside, completely or at least partially, within the main memory 404, within the static memory 406, or within the hardware processor 402 during execution thereof by the machine 400. In an example, one or any combination of the hardware processor 402, the main memory 404, the static memory 406, or the storage device 416 may constitute machine-readable media.

While the machine-readable medium 422 is illustrated as a single medium, the term "machine-readable medium" may include a single medium or multiple media (e.g., a centralized or distributed database, and/or associated caches and servers) configured to store the one or more instructions 424.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 400 and that cause the machine 400 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 424 may further be transmitted or received over a communications network 426 using a transmission medium via the network interface device/transceiver 420 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 420 may include one or more physical jacks (e.g., Ethernet, coaxial, or phone jacks) or one or more antennas to connect to the communications network 426. In an example, the network interface device/transceiver 420 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 400 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee®, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor cause the processor to perform a certain function or group of functions. The computer-executable instructions may be, for example, binaries, intermediate format instructions, such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

A memory device can include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey the information that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method comprising:
receiving a first set of data associated with scooter usage in a geographic area, the first set of data including one or more of: a number of scooters used in the geographic area, a number of scooter trips made in the geographic area, a distance travelled by each scooter in the geographic area, and a battery depletion state of each scooter in the geographic area;
determining, based at least in part on the first set of data, a first number of battery packs for servicing the geographic area, wherein the first number of battery packs has a first power capacity;
determining, based at least in part on the first set of data, a second number of battery packs for servicing the geographic area, wherein the second number of battery packs has a second power capacity;
determining, via a simulation model, a first cost of the first number of battery packs;
determining, via the simulation model, a second cost of the second number of battery packs;
determining that the first cost is lower than the second cost;
selecting the first number of battery packs having the first power capacity;
physically placing a first subset of the first number of battery packs at a first charging station in the geographic area; and
physically placing a second subset of the first number of battery packs at a second charging station in the geographic area.

2. The method of claim 1, wherein the simulation model comprises Monte Carlo simulation.

3. The method of claim 2, further comprising:
randomizing a number of scooter trips associated with each scooter in the geographic area;
randomizing a distance traveled by the each scooter in the geographic area; or
randomizing a battery depletion state of the each scooter in the geographic area.

4. The method of claim 1, further comprising:
determining a subset of the first number of battery packs to be used for a scooter.

5. The method of claim 1, further comprising:
determining, based at least in part on the first set of data, a third number of battery packs for servicing the geographic area, wherein the third number of battery packs has a third power capacity;
determining, via the simulation model, a third cost of the third number of battery packs;
determining that the third cost is lower than the first cost; and
selecting the third number of battery packs having the third power capacity to service the geographic area.

* * * * *